June 29, 1965 E. R. PHILLIPS 3,191,612
JET PIPE PNEUMATIC OR GATE
Filed Aug. 1, 1962
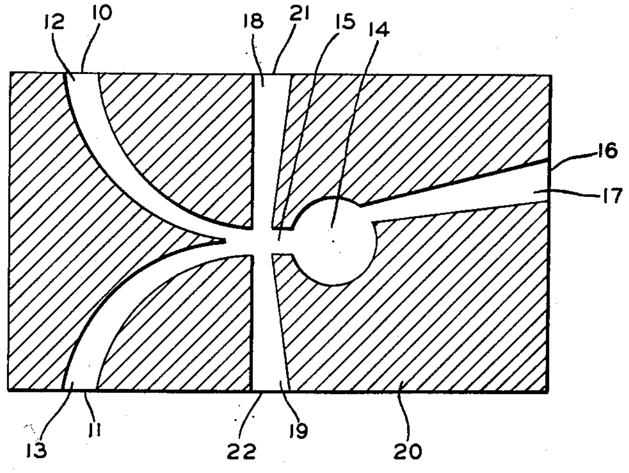
INVENTOR.
EDWIN R. PHILLIPS
BY [signature]
ATTORNEY 3,191,612

JET PIPE PNEUMATIC OR GATE

Edwin R. Phillips, Westport, Conn., assignor to Sperry Rand Corporation, New York, N.Y., a corporation of Delaware Filed Aug. 1, 1962, Ser. No. 213,981
6 Claims. (Cl. 137—81.5)

This invention relates generally to the field of logical devices. More particularly, the invention relates to a fluid device capable of performing the logical Or function.

Mechanization of various logical operations, such as And, Or, Not, etc. are, of course, well known using such components as electron tubes, solid state devices, relays, and the like. The present invention provides a fluid unit which is capable of effecting the logical Or function, which unit has all of the normal advantages attendant with the use of fluid device, i.e. reliability, low cost, no problem of heat dissipation, and absence of moving parts. In addition, the logical structure of this invention is extremely simple and requires no critical tolerances in its fabrication since it does not make use of the "boundary effect" which has found widespread application in recent years in the field of fluid logic devices.

In general, a logical Or unit may be defined as one which will provide an output of a certain level in response to at least one input signal of that level at any one of the plurality of input terminals provided. Thus, if the device in question has two, three, four, etc. input terminals, a signal need only be present at any one of them to provide the desired output. The device of this invention will be illustrated, using as its operative signals a jet of air, though jets of other fluids would be equally effective.

Accordingly, it is an object of this invention to provide an improved, logical Or unit.

It is a further object of this invention to provide a fluid Or unit.

It is a further object of this invention to provide a fluid Or unit which requires no critical tolerances in fabrication.

It is a still further object of this invention to provide a fluid Or unit having isolation of input orifices.

Other and further objects and advantages of the invention will become clear when the following description is read in conjunction with the single figure. The scope of the invention will be pointed out with particularity in the claims.

Briefly stated, in its simplest form the invention comprises at least two input ports connected to an output port through associated input passages, a recovery chamber and an output passage. The presence of a fluid jet at any one of the input ports will be reflected by a pressure differential at the output port. Finally, the unit includes an isolation system to prevent pressure differential from appearing at one input port when no jet is present thereat but is present at another such input port.

The single figure is a preferred embodiment of the fluid logic Or unit of the invention.

Referring now to this figure a pair of input ports, 10 and 11, are shown though additional ones could be provided, limited solely by the available space. These input ports communicate through associated passages 12 and 13 with a recovery chamber 14 through an intermediate passage 15. An output port 16 is provided connected to recovery chamber 14 through passage 17.

Passages 18 and 19 serve to isolate input ports 10 and 11 from each other and from recovery chamber 14.

Ports 10 and 11 and 16, passages 12, 13, 15 and 17, and recovery chamber 14, as well as exhaust-isolation passages 18 and 19, have been satisfactorily formed by scoring, etching or engraving sheet material such as plastic, glass, metal, etc. and covering the scored sheet with a second sheet, the two then being sealed. Other methods of fabrication are possible, however, and no limitation is intended as to the method of preparing the illustrated embodiment of the invention.

Assume that the embodiment illustrated is being operated with a fluid jet of air. If no fluid jet is provided at either of input ports 10 or 11 then, of course, no change in pressure will be observed at output port 16. Ports 10, 11, 16, 21 and 22 (the latter associated with exhaust-isolation passages 18 and 19 respectively) normally exhibit the ambient atmospheric pressure to which the unit is exposed which will be referred to as the reference pressure.

If a fluid jet is present at either or both of ports 10 or 11, it will travel through either or both of passages 12 and 13 as the case may be and into recovery chamber 14 through passage 15. As the pressure rapidly increases within chamber 14 a pressure differential will be observed at output port 16 through output passage 17.

When fluid jets are present at both of ports 10 and 11 they will effectively seal those ports to any back pressure resulting from the accumulated pressure in chamber 14. However, if only one such jet is present, e.g. a jet at port 10, then it would be possible for the buildup of pressure in chamber 14 to be reflected by a pressure differential at port 11. To prevent this situation, isolating passages 18 and 19 have been provided connected, as is shown, to ports 21 and 22 to evacuate any pressure in chamber 14 which cannot be handled by passage 17 and port 16 and which would tend to cause a pressure to appear at an unused input port. The cross-sectional area of passages 18 and 19 is preferably greater than the cross-sectional area of any input passage 12 or 14 at the junction.

In the above description a preferred embodiment of the invention has been discussed but the precise configuration described and illustrated is not essential for operation of the invention. For example, the exhaust-isolation passages 18 and 19 are shown at right angles to the direction of travel to the input jets as they approach recovery chamber 14. This is preferred but not required. Recovery chamber 14 itself could be eliminated and the output taken directly from passage 15. Passage 15 communicating between the junction of exhaust-isolation passages 18 and 19 and input passages 11 and 12 could be eliminated and recovery chamber 14 located at the junction.

Thus it will be clear that, while what has been shown and described is believed to be the best mode in a preferred embodiment of the invention, modifications and variations may be made therein as will be clear to those skilled in the art without departing from the spirit of the invention. Accordingly, the scope of the invention is intended to be measured solely by the appended claims.

What is claimed is:

1. A fluid Or unit including a plurality of input ducts, a chamber having an input port formed therein, an output duct connected to said chamber, said input ducts being located relative to said chamber so that a fluid jet applied at the ends thereof will be introduced into said chamber through said input port, and an isolation duct connected to the junction of said input ducts and said input port of said chamber, the cross-sectional area of said isolation duct at said junction being greater than the cross-sectional area of any of said input ducts at said junction.

2. A fluid Or unit including a block having formed therein a plurality of input orifices, an output port and at least one isolation orifice, a chamber having an input port and an output port, an input duct connecting each of said input orifices to said input port, a duct connecting the output port of said chamber to the output port of said block, and a duct connecting said isolation orifice to the junction of said input ducts and said input port of said chamber.

3. The unit defined in claim 2 wherein the diameter of the cross-sectional area of any of said input ducts at said junction is less than the cross-sectional area of said isolation duct at said junction.

4. A fluid Or unit including a chamber, an inlet duct communicating with the interior of said chamber, an output duct communicating between the interior of said chamber and the atmosphere, at least a pair of input ducts communicating between the atmosphere and said inlet duct, and at least one isolation duct connected between the atmosphere and the junction of said input ducts and said inlet duct, the cross-sectional area of said isolation duct at said junction being greater than the cross-sectional area of any of said input ducts at said junction.

5. A fluid Or unit, comprising in combination: a plurality of converging input ducts terminating in a common orifice, an output duct having an input orifice disposed to receive fluid from said common orifice, a pair of communicating isolation ducts disposed on opposite sides and at right angles to said common orifice.

6. A fluid Or unit according to claim 5 wherein said output duct includes a recovery chamber.

References Cited by the Examiner

UNITED STATES PATENTS

| | | | |
|---|---|---|---|
| 3,022,743 | 2/62 | Engholdt | 103—258 |
| 3,068,880 | 12/62 | Riordan | 137—82 |
| 3,080,886 | 3/63 | Severson | 137—597 |
| 3,107,850 | 10/63 | Warren et al. | 137—81.5 XR |

LAVERNE D. GEIGER, *Primary Examiner.*